US012636892B2

(12) United States Patent
Tsuboi

(10) Patent No.: US 12,636,892 B2
(45) Date of Patent: May 26, 2026

(54) INK SUPPLY UNIT AND INKJET RECORDING APPARATUS PROVIDED THEREWITH

(71) Applicant: KYOCERA Document Solutions Inc., Osaka (JP)

(72) Inventor: Shun Tsuboi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 135 days.

(21) Appl. No.: 18/731,830

(22) Filed: Jun. 3, 2024

(65) Prior Publication Data

US 2024/0408881 A1 Dec. 12, 2024

(30) Foreign Application Priority Data

Jun. 7, 2023 (JP) ................................ 2023-093870

(51) Int. Cl.
*B41J 2/175* (2006.01)
*B41J 2/18* (2006.01)

(52) U.S. Cl.
CPC ............ *B41J 2/17596* (2013.01); *B41J 2/18* (2013.01)

(58) Field of Classification Search
CPC . B41J 2/17596; B41J 2/18; B41J 2/175; B41J 2/17509; B41J 2/17523; B41J 2/17513; B41J 2/01
USPC ............................................................ 347/85
See application file for complete search history.

(56) References Cited

U.S. PATENT DOCUMENTS

2007/0195137 A1* 8/2007 Morita ................ B29C 66/1142 347/85
2008/0297569 A1* 12/2008 Umeda ................ B41J 2/17513 347/85
2020/0101746 A1 4/2020 Mukoyama et al.

FOREIGN PATENT DOCUMENTS

JP 2002-036586 A 2/2002
JP 2020-049908 A 4/2020

* cited by examiner

*Primary Examiner* — Douglas X Rodriguez
*Assistant Examiner* — Alexander D Shenderov
(74) *Attorney, Agent, or Firm* — Stein IP, LLC

(57) ABSTRACT

An ink supply unit includes an ink supply path and at least one element component. The ink supply path includes a first ink flow hole, a first valve member, and a first biasing member. The element component includes a second ink flow hole, a second valve member, and a second biasing member. When the element component is attached to the ink supply path, the first valve member and the second valve member respectively separate from the first ink flow hole and the second ink flow hole against biasing forces of the first biasing member and the second biasing member. When the element component is detached from the ink supply path, the first valve member and the second valve member are respectively caused by the biasing forces of the first biasing member and the second biasing member to close the first ink flow hole and the second ink flow hole.

5 Claims, 4 Drawing Sheets

INK SUPPLY UNIT AND INKJET RECORDING APPARATUS PROVIDED THEREWITH

INCORPORATION BY REFERENCE

This application is based on and claims the benefit of priority from Japanese Patent Application No. 2023-093870 filed on Jun. 7, 2023, the contents of which are hereby incorporated by reference.

BACKGROUND

The present disclosure relates to an ink supply unit to be mounted in an inkjet recording apparatus, and an inkjet recording apparatus provided therewith, and more particularly, to an attaching structure for attaching an element component with respect to a liquid supply flow path.

Some conventional inkjet recording apparatuses include an ink supply unit that supplies ink from an ink tank to a recording head. The ink supply unit is constituted of element components such as a flow path through which ink flows, a pump that controls ink flow, a valve, etc.

SUMMARY

According to one aspect of the present disclosure, an ink supply unit is connected between an ink container for storing ink therein and at least one recording head including a plurality of nozzles for ejecting the ink therefrom, and the ink supply unit supplies the ink from the ink container to the recording head. The ink supply unit includes an ink supply path through which the ink flows, and at least one element component that is attachable and detachable with respect to the ink supply path, and that communicates with the ink supply path. The ink flow path includes a first ink flow hole that is formed in an attachment surface for the element component, a first valve member that opens and closes the first ink flow hole, and a first biasing member that biases the first valve member in a direction approaching the first ink flow hole. The element component includes a second ink flow hole that is formed at a position overlapping the first ink flow hole, a second valve member that opens and closes the second ink flow hole, and a second biasing member that biases the second valve member in a direction approaching the second ink flow hole. When the element component is attached to the ink supply path, the first valve member and the second valve member contact each other, and the first valve member and the second valve member respectively separate from the first ink flow hole and the second ink flow hole against biasing forces of the first biasing member and the second biasing member, thereby causing the first ink flow hole and the second ink flow hole to communicate with each other to form a flow path for the ink. When the element component is detached from the ink supply path, the first valve member and the second valve member separate from each other, and the first valve member and the second valve member are respectively caused by the biasing forces of the first biasing member and the second biasing member to close the first ink flow hole and the second ink flow hole.

DETAILED DESCRIPTION

[1. Configuration of Inkjet Recording Apparatus]

Figure 1:
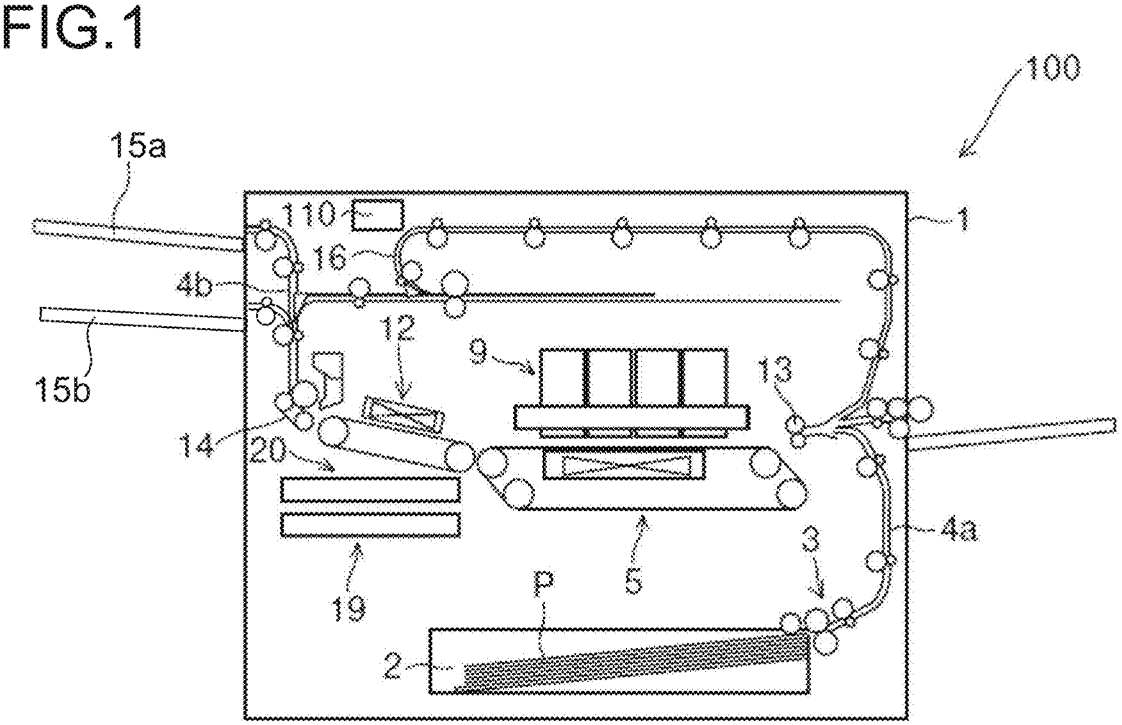
FIG. 1 is an explanatory diagram illustrating a schematic configuration of a printer as an inkjet recording apparatus according to an embodiment of the present disclosure.

Hereinafter, an embodiment of the present disclosure will be described with reference to the accompanying drawings. FIG. 1 is an explanatory diagram illustrating a schematic configuration of a printer 100 as an inkjet recording apparatus according to an embodiment of the present disclosure. The printer 100 is provided with a sheet feeding cassette 2, which is a sheet storage portion. The sheet feeding cassette 2 is disposed at a lower part inside a printer main body 1. Inside the sheet feeding cassette 2, a paper sheet P is stored, which is an example of a recording medium.

On a downstream side of the sheet feeding cassette 2 in a sheet conveyance direction, that is, on an upper right side of the sheet feeding cassette 2 in FIG. 1, a sheet feeding device 3 is disposed. By this sheet feeding device 3, paper sheets P are sent out, one by one separately, toward the upper right side of the sheet feeding cassette 2 in FIG. 1.

The printer 100 includes a first sheet conveyance path **4*a* disposed inside thereof. The first sheet conveyance path 4*a* is disposed on the upper right side with respect to the sheet feeding cassette 2, toward which a paper sheet P is fed from the sheet feeding cassette 2. A paper sheet P sent out from the sheet feeding cassette 2 is, by the first sheet conveyance path 4*a*, conveyed vertically upward along a side surface of the printer main body 1**.

At a downstream end of the first sheet conveyance path **4*a* in the sheet conveyance direction, a pair of registration rollers 13 are provided. Furthermore, immediately close to the pair of registration rollers 13 on a downstream side thereof in the sheet conveyance direction, a first conveyance unit 5 and a recording portion 9 are disposed. A paper sheet P sent out from the sheet feeding cassette 2 passes through the first sheet conveyance path 4*a* to reach the pair of registration rollers 13. While correcting oblique feeding of the paper sheet P, the pair of registration rollers 13 send out the paper sheet P toward the first conveyance unit 5 (in particular, a first conveyance belt 8 which will be described later), with timing coordinated with ink ejecting operation performed by the recording portion 9**.

The paper sheet P, having been sent out by the pair of registration rollers 13 into the first conveyance unit 5, is then conveyed by the first conveyance belt 8 to a position facing the recording portion 9 (in particular, recording heads **17*a* to 17*c* which will be described later). Ink is ejected from the recording portion 9 onto the paper sheet P, and thereby an image is recorded on the paper sheet P. At this time, the ejection of ink from the recording portion 9 is controlled by a control device 110 disposed inside the printer 100**.

In the sheet conveyance direction, on a downstream side (a left side in FIG. 1) of the first conveyance unit 5, a second conveyance unit 12 is disposed. The paper sheet P, having had an image recorded thereon by the recording portion 9, is then sent to the second conveyance unit 12. The ink having been ejected onto a surface of the paper sheet P is dried while the paper sheet P is passing through the second conveyance unit 12.

In the sheet conveyance direction, at a position that is downstream of the second conveyance unit 12 and close to a left side surface of the printer main body 1, a decurler portion 14 is provided. The paper sheet P, having had the ink dried through the second conveyance unit 12, is then sent to the decurler portion 14, where curl having been generated in the paper sheet P is corrected.

In the sheet conveyance direction, at a position that is downstream of (in FIG. 1, above) the decurler portion 14, a second sheet conveyance path 4*b* is provided. In a case where no duplex recording is to be performed, the paper sheet P having passed through the decurler portion 14 then passes through the second sheet conveyance path 4*b* to be discharged onto a sheet discharge tray 15*a* provided outside the left side surface of the printer 100. Below the sheet discharge tray 15*a*, a sub discharge tray 15*b* is provided for discharging a discarded paper sheet (a waste paper sheet) on which printing failure or the like has occurred.

At a position that is in an upper part of the printer main body 1 and that is above the recording portion 9 and the second conveyance unit 12, a reverse conveyance path 16 is provided for execution of duplex recording. In a case where duplex recording is to be performed, the paper sheet P on which recording with respect to one side (a first side) thereof has been completed and that has passed through the second conveyance unit 12 and the decurler portion 14 is sent, via the second sheet conveyance path 4*b*, into the reverse conveyance path 16.

The conveyance direction of the paper sheet P having been sent into the reverse conveyance path 16 is switched for subsequent recording to be performed with respect to the other side (a second side) of the paper sheet P. Then, the paper sheet P is sent rightward through the upper part of the printer main body 1, to be sent via the pair of registration rollers 13 into the first conveyance unit 5 again, with the second side thereof facing upward. In the first conveyance unit 5, the paper sheet P is conveyed to the position facing the recording portion 9, and ink is ejected from the recording portion 9 so as to record an image on the second side. After the duplex recording, the paper sheet P sequentially passes through the second conveyance unit 12, the decurler portion 14, and the second sheet conveyance path 4*b*, to be discharged onto the sheet discharge tray 15*a*.

Further, below the second conveyance unit 12, a maintenance unit 19 and a cap unit 20 are disposed. The maintenance unit 19, when a purge is executed, horizontally moves to a position below the recording portion 9, and wipes off ink pushed out from ink ejection ports of the recording heads and collects the wiped-off ink. Here, purge refers to operation of forcibly pushing out ink from an ink ejection port of a recording head in order to expel thickened ink, foreign manner, and air bubbles from inside the ink ejection port. For capping ink ejection surfaces of the recording heads, the cap unit 20 horizontally moves to below the recording portion 9, and further moves upward to be attached to lower surfaces of the recording heads.

Figure 2:
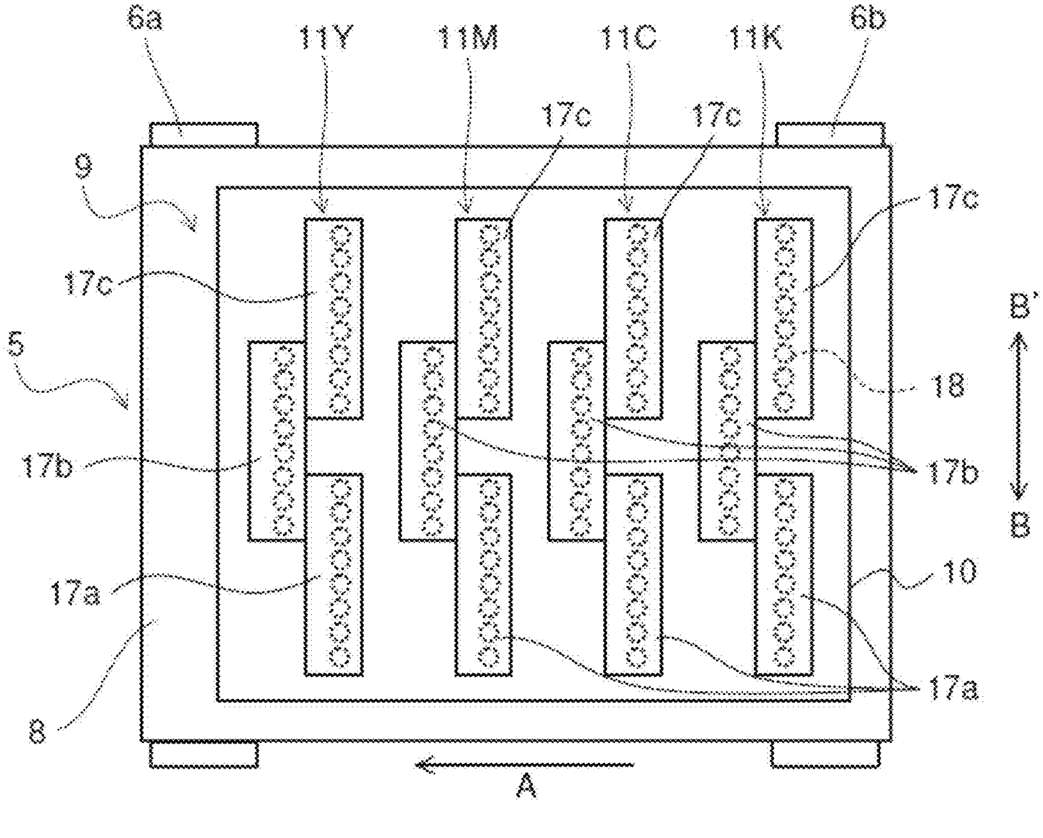
FIG. 2 is a plan view of a recording portion included in the printer.

FIG. 2 is a plan view of the recording portion 9. The recording portion 9 includes a head housing 10 and line heads 11Y, 11M, 11C, and 11K. The line heads 11Y to 11K are held in the head housing 10 at such a height that maintains a predetermined distance (e.g., 1 mm) from a conveyance surface of the first conveyance belt 8, which is an endless belt stretched by a plurality of rollers including a driving roller 6*a*, a driven roller 6*b*, and a tension roller (unillustrated). The driving roller 6*a* causes the first conveyance belt 8 to rotate along the conveyance direction (an arrow-A direction) of the paper sheet P.

The line heads 11Y to 11K each include a plurality of (here, three) recording heads 17*a* to 17*c*. The recording heads 17*a* to 17*c* are arranged in a staggered manner along a sheet width direction (an arrow-BB' direction) orthogonal to the sheet conveyance direction (the arrow-A direction). The recording heads 17*a* to 17*c* each include a plurality of ink ejection ports 18 (nozzles). The ink ejection ports 18 are arranged at regular intervals in a recording-head width direction, that is, the sheet width direction (the arrow-BB' direction). From each of the line heads 11Y to 11K, via the ink ejection ports 18 of the recording heads 17*a* to 17*c*, ink of yellow (Y), magenta (M), cyan (C), or black (K) is ejected toward the paper sheet P conveyed by the first conveyance belt 8.

The recording heads 17*a* to 17*c* constituting each of the line heads 11C to 11K are supplied with ink of a corresponding one of four colors (cyan, magenta, yellow, and black) from an ink container 50 (see FIG. 3) in accordance with colors of the line heads 11C to 11K.

Based on a control signal from the control device 110 (see FIG. 1), each of the recording heads 17*a* to 17*c*, in accordance with image data received from an external computer, ejects ink through the ink ejection ports 18 toward the paper sheet P, which is conveyed by being held by suction on the conveyance surface of the first conveyance belt 8. In this manner, on the paper sheet P held on the first conveyance belt 8, a color image is formed by superimposing inks of the four colors of cyan, magenta, yellow, and black. Further, at one end part of the recording heads 17*a* to 17*c* in a longitudinal direction (the arrow-BB' direction) thereof, which is orthogonal to the sheet conveyance direction (the arrow-A direction), a cleaning liquid supply portion (unillustrated) is provided for supplying cleaning liquid. The cleaning liquid supply portion includes a large number of cleaning liquid supply ports formed therein.

In the printer 100, in order to clean ink ejection surfaces of the recording heads 17*a* to 17*c*, at a start of printing after a long-term shutdown and in an interval between printing operations, recovery operation of the recording heads 17*a* to 17*c* is executed in which ink is pushed out (purged) from all of the recording heads 17*a* to 17*c* through their ink ejection ports 18, with the cleaning liquid supplied through the cleaning liquid supply ports, and then the ink having been ejected to the ink ejection surfaces are wiped off together with the cleaning liquid by a wiper (unillustrated), and thereby the printer 100 is made ready for the next printing operation. The ink and the cleaning liquid having been wiped off from the ink ejection surfaces are collected by an ink receiving portion (unillustrated).

Figure 3:
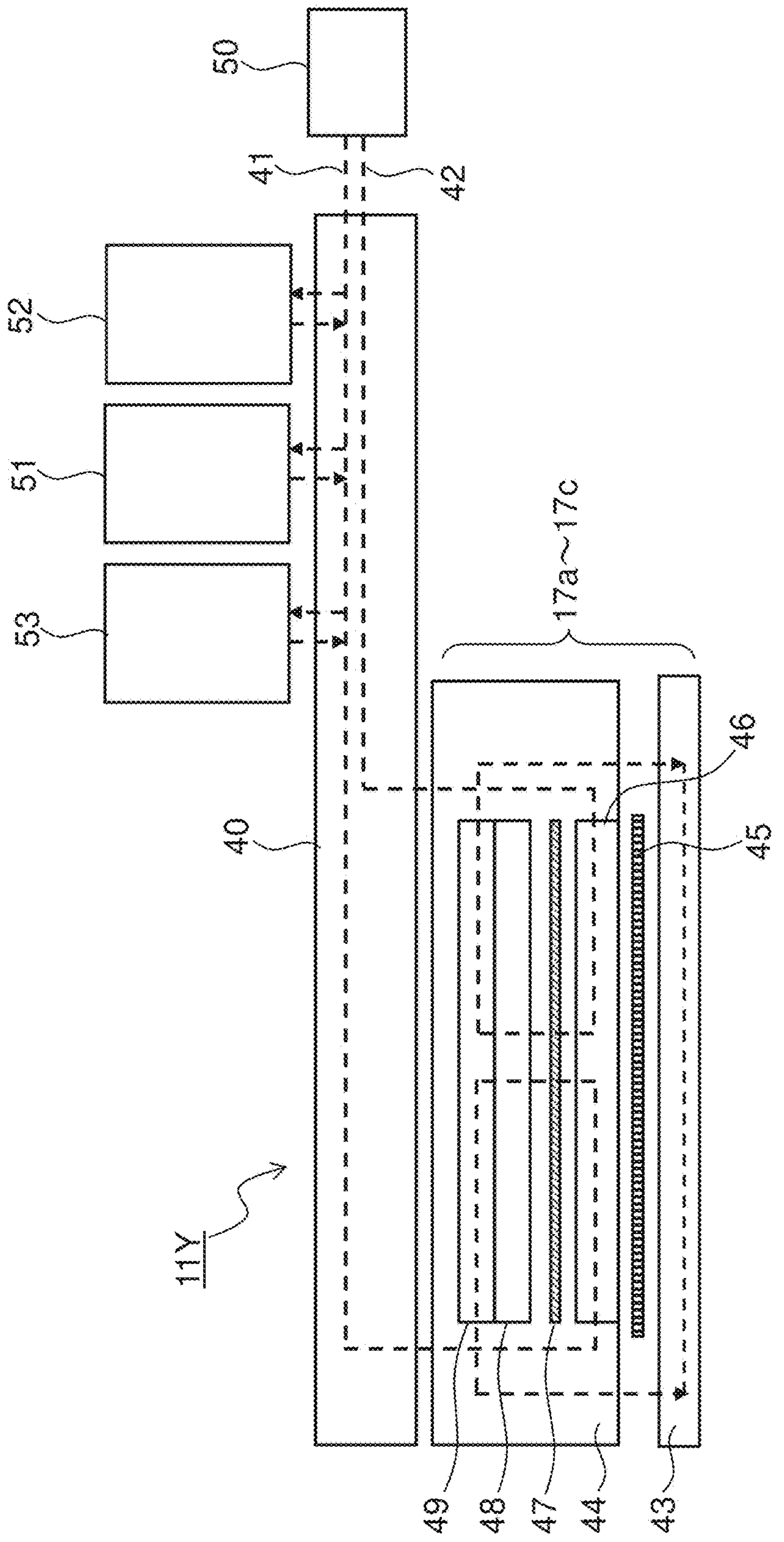
FIG. 3 is a schematic diagram illustrating an internal structure of an ink supply path and a recording head constituting a line head of the printer.

FIG. 3 is a schematic diagram illustrating an internal structure of an ink supply path 40 and recording heads 17*a* to 17*c* constituting the line head 11Y of the printer 100. As to the line heads 11M to 11K, which are totally identical to the line head 11Y in configuration, descriptions thereof will be omitted.

As illustrated in FIG. 3, to the recording heads 17*a* to 17*c*, the ink supply path 40 is connected through which ink and cleaning liquid pass. Inside the ink supply path 40, there are formed two supply paths through which ink flows, namely, a first supply path 41 and a second supply path 42. The first supply path 41 and the second supply path 42 are connected to the ink container 50. To the ink container 50, a pump (unillustrated) is connected to send out ink.

The first supply path 41 is used to supply ink from the ink container 50 to the recording heads 17*a* to 17*c*, and the second supply path 42 is used to collect ink from the recording heads 17*a* to 17*c* into the ink container 50. Note that, in a case of recording an image that requires a large amount of ink ejection, both the first supply path 41 and the second supply path 42 can be used to supply ink to the recording heads 17*a* to 17*c*.

To the ink supply path 40, a sub tank 51, an open-close valve 52, and a check valve 53 are attached. The sub tank 51, the open-close valve 52, and the check valve 53 are each attachable and detachable with respect to the ink supply path 40. The ink supply path 40, together with the sub tank 51, the open-close valve 52, and the check valve 53, constitute an ink supply unit 80 (see FIG. 4) that supplies ink from the ink container 50 to the recording heads 17*a* to 17*c*. A description will be given later of an attaching structure of the sub tank 51, the open-close valve 52, and the check valve 53 with respect to the ink supply path 40.

The sub tank 51 is disposed on the first supply path 41, at a position between the ink container 50 and the recording heads 17*a* to 17*c*. The sub tank 51 temporarily stores ink supplied from the ink container 50.

The open-close valve 52 is disposed on the first supply path 41, at a position between the ink container 50 and the sub tank 51. The open-close valve 52, at a position between the ink container 50 and the sub tank 51, opens and closes the first supply path 41. Normally, a constant amount of ink is stored in the sub tank 51, and ink is circulated between the sub tank 51 and the recording heads 17*a* to 17*c*. In this state, the open-close valve 52 is in a closed state. When the ink in the sub tank 51 is consumed due to image recording, the open-close valve 52 is opened to supply a predetermined amount of ink from the ink container 50 into the sub tank 51.

The check valve 53 is disposed on the first supply path 41, at a position between the sub tank 51 and the recording heads 17*a* to 17*c*. The check valve 53 prevents ink in the first supply path 41 from flowing reversely from the recording heads 17*a* to 17*c* back to the sub tank 51.

The recording heads 17*a* to 17*c* each include a head front portion 43, a head rear portion 44, and a heater 45. In the head front portion 43, an ink ejection surface is provided on which a large number of ink ejection ports 18 (see FIG. 2) are arranged.

The head rear portion 44 includes an ink heating flow path 46, a filter 47, a reservoir tank 48, and a damper 49. The first supply path 41 and the second supply path 42 are connected to the ink ejection ports 18 of the head front portion 43 after sequentially passing through the ink heating flow path 46, the filter 47, the reservoir tank 48, and the damper 49.

Between the head front portion 43 and the head rear portion 44, the heater 45 is disposed. The heater 45 heats ink in the ink heating flow path 46, which will be described later, to a predetermined temperature as necessary, and also heats the head front portion 43 for smooth ejection of ink through the ink ejection ports 18.

The ink heating flow path 46 heats ink in the first supply path 41 and the second supply path 42 to the predetermined temperature. The ink heating flow path 46 is provided in the head rear portion 44, at a position adjacent to the heater 45. The filter 47 removes foreign matter from ink passing through the first supply path 41. The reservoir tank 48 temporarily stores ink passing through the first supply path 41 and the second supply path 42. The damper 49 is formed of a flexible resin film, and ink is pushed out to the head front portion 43 by pulsation of the damper 49.

[2. Configuration of Ink Supply Unit]

Figure 4:
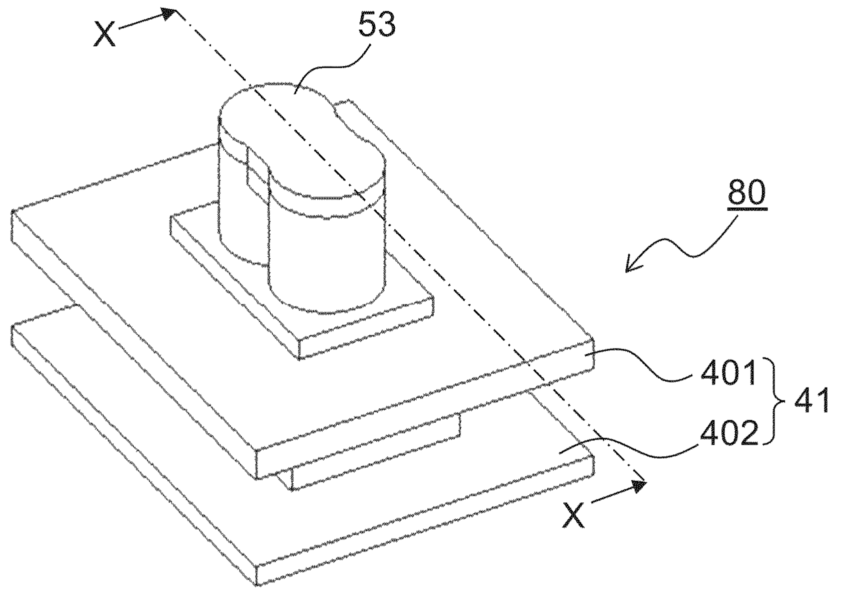
FIG. 4 is a partial perspective view of an ink supply unit, illustrating a part including a first supply path and a check valve.
Figure 5:
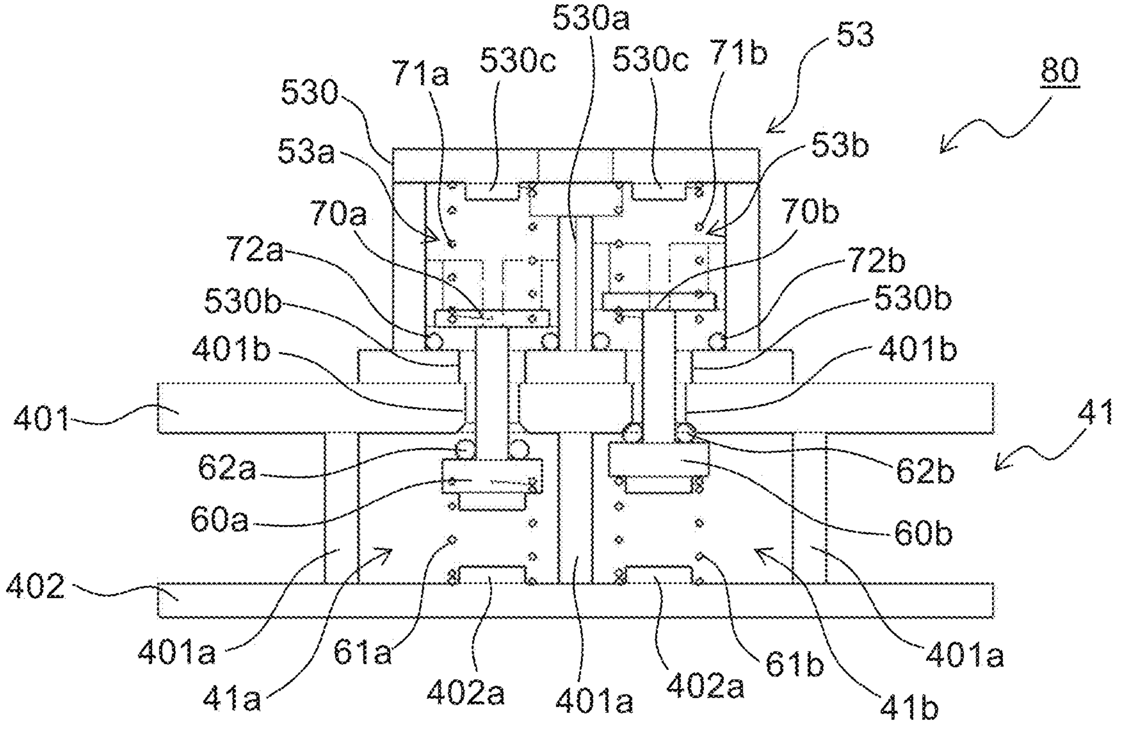
FIG. 5 is a partial sectional view of the ink supply unit, illustrating a part including the first supply path and the check valve.
Figure 6:
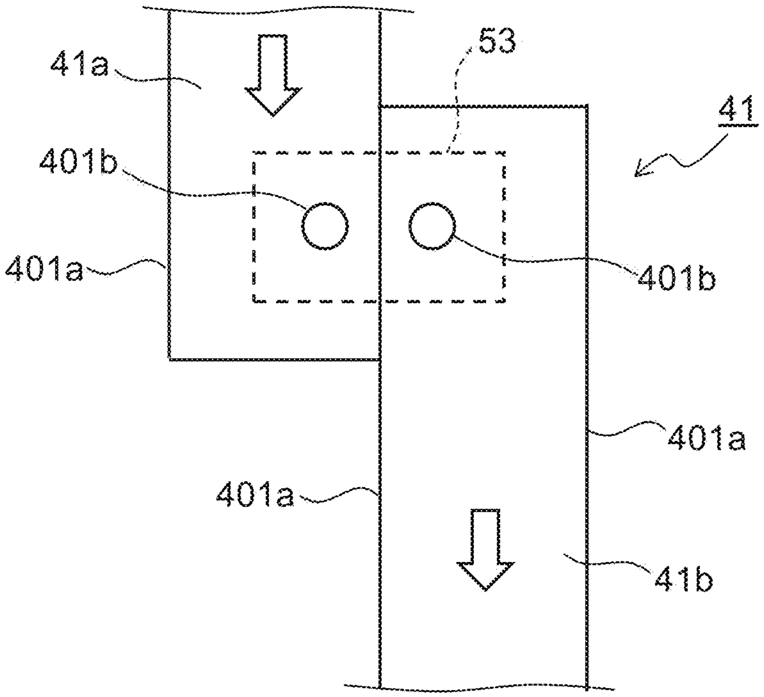
FIG. 6 is a partial plan view of the first supply path, illustrating a part in the vicinity of the check valve.

FIG. 4 is a partial perspective view of the ink supply unit 80, illustrating a part including the first supply path 41 and the check valve 53. FIG. 5 is a partial sectional view of the ink supply unit 80, illustrating a part including the first supply path 41 and the check valve 53 (taken along line XX in FIG. 4). FIG. 6 is a partial plan view of the first supply path 41, illustrating a part in the vicinity of the check valve 53.

The first supply path 41 includes a resin plate 401 and a transparent plate 402. The resin plate 401 includes three flow path forming ribs 401*a* extending in a flowing direction of ink (a direction perpendicular to a paper surface of FIG. 5, an up-down direction in FIG. 6). Leading edges of the flow path forming ribs 401*a* are fixed to the transparent plate 402. An interior of the first supply path 41 is partitioned by the flow path forming ribs 401*a* into an upstream-side supply path 41*a* and a downstream-side supply path 41*b*. The check valve 53 is disposed at a coupling portion between the upstream-side supply path 41*a* and the downstream-side supply path 41*b*.

The resin plate 401 is formed of a laser light absorbing resin, and the transparent plate 402 is formed of a laser light transmissive resin. The first supply path 41 is formed by applying laser light to the flow path forming ribs 401*a* from a side of the transparent plate 402 so as to bond (weld) the transparent plate 402 and the flow path forming ribs 401*a* together. Note that, although not illustrated here, the second supply path 42 (see FIG. 3), like the first supply path 41, is also formed of the resin plate 401 and the transparent plate 402.

In the upstream-side supply path 41*a* and the downstream-side supply path 41*b*, there are disposed first valve members 60*a* and 60*b*, respectively. The first valve members 60*a* and 60*b* each have a large-diameter portion 601 and a small-diameter portion 602 (see FIG. 7). The small-diameter portions 602 protrude through first ink flow holes 401*b* formed in the resin plate 401 into an inside of the check valve 53.

Between each of the first valve members 60*a* and 60*b* and the transparent plate 402, first coil springs 61*a* and 61*b* are disposed, respectively. One end parts of the first coil springs 61*a* and 61*b* are held by spring holding portions 402*a* of the transparent plate 402. To the other end parts of the first coil springs 61*a* and 61*b*, the large-diameter portions 601 of the first valve members 60*a* and 60*b* are fixed, respectively. The first coil springs 61*a* and 61*b* bias the first valve members 60*a* and 60*b*, respectively, in a direction (an upward direction in FIG. 5) approaching the first ink flow holes 401*b*.

The first valve members 60*a* and 60*b* have first scaling members 62*a* and 62*b*, respectively, which are attached to coupling portions between their respective large-diameter portions 601 and small-diameter portions 602. The first sealing members 62*a* and 62*b* are each an O-ring formed of an elastic material.

The check valve 53 includes a housing 530, second valve members 70*a* and 70*b*, and second coil springs 71*a* and 71*b*. An inside of the housing 530 is partitioned by a partition wall 530*a* into a first storage chamber 53*a* and a second storage chamber 53*b*. The first storage chamber 53*a* and the second storage chamber 53*b* communicate with each other above the partition wall 530*a*. The housing 530 is fixed to the resin plate 401 with a fixing member (unillustrated) such as a screw.

In a lower surface of the housing 530, second ink flow holes 530*b* are formed. The second ink flow holes 530*b* are formed at positions overlapping the first ink flow holes 401*b*. Via the first ink flow holes 401*b* and the second ink flow holes 530*b*, the upstream-side supply path 41*a* and the downstream-side supply path 41*b* communicate with the inside of the check valve 53.

In the first storage chamber 53*a* and the second storage chamber 53*b*, the second valve members 70*a*, 70*b* and the second coil springs 71*a*, 71*b* are disposed, respectively. One end parts of the second coil springs 71*a* and 71*b* are held by spring holding portions 530*c* of the housing 530. To the other end parts of the second coil springs 71*a* and 71*b*, the second valve members 70*a* and 70*b* are fixed, respectively. The second coil springs 71*a* and 71*b* bias the second valve members 70*a* and 70*b*, respectively, in a direction (a downward direction in FIG. 5) approaching the second ink flow holes 530*b*.

To perimeter parts of the second ink flow holes 530*b*, second sealing members 72*a* and 72*b* are attached. The second sealing members 72*a* and 72*b* are each an O-ring formed of an elastic material, for example.

Next, a description will be given of operation of the check valve 53 attached to the first supply path 41. With no ink being sent out from the sub tank 51 (see FIG. 3), as illustrated in FIG. 5, the small-diameter portion 602 of the first valve member 60*a* biased upward by the first coil spring 61*a* pushes up the second valve member 70*a* of the check valve 53. Thereby, against a biasing force of the second coil spring 71*a*, the second valve member 70*a* separates from the second sealing member 72*a* of the first storage chamber 53*a*.

On the other hand, the first valve member 60*a* is pushed down by a pressing force (drag) received from the second valve member 70*a*. Thereby, the first sealing member 62*a* attached to the first valve member 60*a* separates from the first ink flow hole 401*b* of the upstream-side supply path 41*a*.

That is, an upward pressing force acting from the first coil spring 61*a* on the first valve member 60*a* and a downward pressing force acting from the second coil spring 71*a* on the second valve member 70*a* balance each other, and the first ink flow hole 401*b* of the upstream-side supply path 41*a* and the second ink flow hole 530*b* of the first storage chamber 53*a* are both opened to cause the upstream-side supply path 41*a* and the first storage chamber 53*a* to communicate with each other.

In contrast, an upward pressing force acting from the first coil spring 61*b* on the first valve member 60*b* is greater than a downward pressing force acting from the second coil spring 71*b* on the second valve member 70*b*. Thus, although the small-diameter portion 602 of the first valve member 60*b* pushes up the second valve member 70*b* and the second valve member 70*b* is separate from the second sealing member 72*b* of the second storage chamber 53*b* against a biasing force of the second coil spring 71*b*, the first sealing member 62*b* attached to the first valve member 60*b* is pressed by a biasing force of the first coil spring 61*b* against the first ink flow hole 401*b* of the downstream-side supply path 41*b*.

That is, although the second ink flow holes 530*b* of the second storage chamber 53*b* is opened, the first ink flow hole 401*b* of the downstream-side supply path 41*b* is closed, and thus the second storage chamber 53*b* and the downstream-side supply path 41*b* do not communicate with each other.

When ink is supplied from the sub tank 51, ink flows through the upstream-side supply path 41*a* into the first storage chamber 53*a*, and then, passing above the partition wall 530*a*, flows into the second storage chamber 53*b*. At this time, a resultant of the biasing force of the second coil spring 71*b* acting on the second valve member 70*b* and pressure of the ink becomes greater than the upward pressing force acting from the first coil spring 61*b* on the first valve member 60*b*. As a result, the first valve member 60*b* is pushed down by the second valve member 70*b*, and the first sealing member 62*b* attached to the first valve member 60*b* separates from the first ink flow hole 401*b* of the downstream-side supply path 41*b*.

Thereby, the first ink flow hole 401*b* of the downstream-side supply path 41*b* and the second ink flow hole 530*b* of the second storage chamber 53*b* are both opened to allow the downstream-side supply path 41*b* and the second storage chamber 53*b* to communicate with each other. Thus, an ink flow path is opened that starts from the upstream-side supply path 41*a* and reaches the downstream-side supply path 41*b* via the first storage chamber 53*a* and the second storage chamber 53*b*.

When ink supply from the sub tank 51 is stopped, as illustrated in FIG. 5, the first valve member 60*b* is pushed up again by the biasing force of the first coil spring 61*b* to press the first sealing member 62*b* attached to the first valve member 60*b* against the first ink flow hole 401*b* of the downstream-side supply path 41*b*. Thereby, the ink flow path that starts from the upstream-side supply path 41*a* and reaches the downstream-side supply path 41*b* is closed.

With the above-described operation of the check valve 53, it is possible to prevent reverse flow of ink from the downstream-side supply path 41*b* toward the upstream-side supply path 41*a*.

Figure 7:
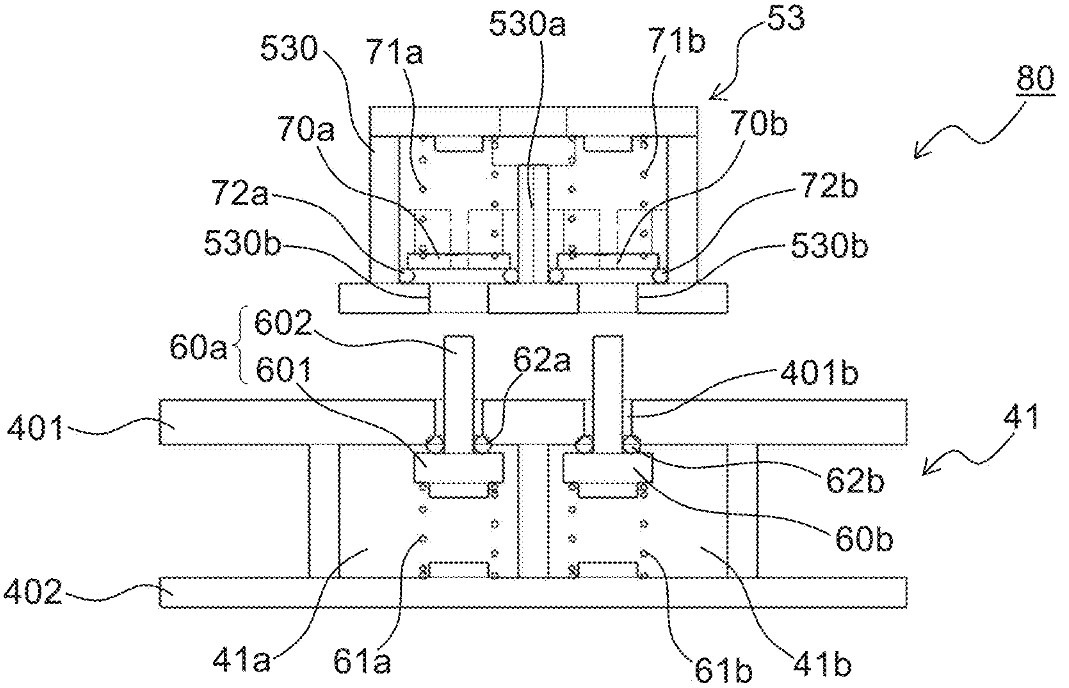
FIG. 7 is a partial sectional view of the ink supply unit, illustrating a part including the first supply path and the check valve, with the check valve detached from the first supply path.

FIG. 7 is a partial sectional view of the ink supply unit 80, illustrating a part including the first supply path 41 and the check valve 53, with the check valve 53 detached from the first supply path 41. When the check valve 53 is detached from the first supply path 41, the pressing force (drag) from the second valve members 70*a* and 70*b* stops acting on the first valve members 60*a* and 60*b*. As a result, the first sealing members 62*a* and 62*b* attached to the first valve members 60*a* and 60*b* are pressed by the biasing force of the first coil springs 61*a* and 61*b* against the perimeter parts of the first ink flow holes 401*b*, so that the first ink flow holes 401*b* of the upstream-side supply path 41*a* and the downstream-side supply path 41*b* are both closed. Further, the small-diameter portions 602 of the first valve members 60*a* and 60*b* protrude from the first ink flow holes 401*b*.

On the other hand, the pressing force (drag) from the first valve members 60*a* and 60*b* stops acting on the second valve members 70*a* and 70*b*. As a result, the second valve members 70*a* and 70*b* are pressed by the biasing forces of the second coil springs 71*a* and 71*b* against the second sealing members 72*a* and 72*b* disposed at the perimeter parts of the second ink flow holes 530*b*, so that the second ink flow holes 530*b* of the first storage chamber 53*a* and the second storage chamber 53*b* are both closed.

To attach the check valve 53 to the first supply path 41, from the state illustrated in FIG. 7, the check valve 53 is pressed against the first supply path 41. At this time, the second ink flow holes 530*b* of the check valve 53 are aligned with the small-diameter portions 602 of the first valve members 60*a* and 60*b* protruding from the first ink flow holes 401*b*. Then, while inserting the small-diameter portions 602 of the first valve members 60*a* and 60*b* into the second ink flow holes 530*b*, the check valve 53 is pressed against the first supply path 41, to which the check valve 53 is fixed with a screw or the like.

Thereby, the state illustrated in FIG. 5 is recovered in which the upstream-side supply path 41*a* and the first storage chamber 53*a* communicate with each other and the second storage chamber 53*b* and the downstream-side supply path 41*b* do not communicate with each other. And, only when ink is supplied from the sub tank 51, the second storage chamber 53*b* and the downstream-side supply path 41*b* are caused to communicate with each other.

Note that, although exemplified and described in the above embodiment is the attaching structure of the check valve 53 as an element component to be attached to the ink supply path 40, attaching structures for the sub tank 51 and the open-close valve 52 with respect to the ink supply path 40 are similar to that in the above embodiment.

According to the configuration described above, it is possible to individually replace the element components constituting the ink supply unit 80, such as the sub tank 51, the open-close valve 52, the check valve 53, etc. This contributes to reduced maintenance cost as compared to a case of replacing the entire ink supply unit 80.

Further, by providing the first supply path 41 with the first valve members 60*a* and 60*b*, and providing the check valve 53 (an element component) with the second valve members 70*a* and 70*b*, it is possible to suppress leakage of ink from both the first supply path 41 and an element component during replacement of the element component. Thus, operations of closing the ink supply path 40, collecting ink, and the like become unnecessary during replacement of the element component, and this contributes to improved maintainability.

It should be understood that the present disclosure is not limited to the above embodiment, and various modifications are possible within the scope of the present disclosure.

For example, described in the above embodiment is a configuration where the check valve 53 is attached to the first supply path 41 in an attachable/detachable manner, but a similar configuration is applicable to a case where the check valve 53 is attached to the second supply path 42 in the attachable/detachable manner.

Further, although exemplified in the above embodiment as element components constituting the ink supply unit 80 are the sub tank 51, the open-close valve 52, and the check valve 53, the present disclosure is also applicable to the ink supply unit 80 provided with other element components.

Further, in the above embodiment, the ink supply path 40 is constituted, using the resin plate 401 and the transparent plate 402, by applying laser light from the side of the transparent plate 402 to the resin plate 401 to bond (weld) the resin plate 401 and the transparent plate 402 together, but the transparent plate 402 is not a limitation, and can be any resin plate as long as it has laser-light transmissivity.

Further, described in the above embodiment is an example in which a color printer which records a color image using four colors of ink is used as the inkjet recording apparatus, but the ink supply unit of the present embodiment can also be used in a case where a monochrome printer is used which records a monochrome image using black ink.

The present disclosure is usable in an inkjet recording apparatus such as an inkjet printer including an ink supply unit disposed between an ink container and a recording head.

What is claimed is:

1. An ink supply unit that is connected between an ink container for storing ink therein and at least one recording head including a plurality of nozzles for ejecting the ink therefrom, and that supplies the ink from the ink container to the recording head via a sub tank, the ink supply unit comprising:

an ink supply path through which the ink flows; and at least one element component that is attachable and detachable with respect to the ink supply path, and that communicates with the ink supply path, wherein the ink supply path includes a first ink flow hole that is formed in an attachment surface for the element component, a first valve member that opens and closes the first ink flow hole, and a first biasing member that biases the first valve member in a direction approaching the first ink flow hole, the element component includes a second ink flow hole that is formed at a position overlapping the first ink flow hole, a second valve member that opens and closes the second ink flow hole, and a second biasing member that biases the second valve member in a direction approaching the second ink flow hole, when the element component is attached to the ink supply path, the first valve member and the second valve member contact each other, and the first valve member and the second valve member respectively separate from the first ink flow hole and the second ink flow hole against biasing forces of the first biasing member and the second biasing member, thereby causing the first ink flow hole and the second ink flow hole to communicate with each other to form a flow path for the ink, and when the element component is detached from the ink supply path, the first valve member and the second valve member separate from each other, and the first valve member and the second valve member are respectively caused by the biasing forces of the first biasing member and the second biasing member to close the first ink flow hole and the second ink flow hole the ink supply path includes an upstream-side supply path and a downstream-side supply path, and a pair of the first valve members and a pair of the first biasing members respectively disposed in the upstream-side supply path and a downstream-side supply path, the element component is a check valve that is disposed at a coupling portion between the upstream-side supply path and the downstream-side supply path, and that restricts the ink from flowing from the recording head to the sub tank, the check valve includes a housing including a first storage chamber that communicates with the upstream-side supply path and a second storage chamber that communicates with the downstream-side supply path, and a pair of the second valve members and a pair of the second biasing members respectively disposed in the first storage chamber and the second storage chamber, with the ink not being supplied from the sub tank, a biasing force acting from the first biasing member of the upstream-side supply path on the first valve member and a biasing force acting from the second biasing member of the first storage chamber on the second valve member are balanced, so that the upstream-side supply path and the first storage chamber communicate with each other, and a biasing force acting from the first biasing member of the downstream-side supply path on the first valve member is larger than a biasing force acting from the second biasing member of the second storage chamber on the second valve member, so that the second storage chamber and the downstream-side supply path do not communicate with each other, and when the ink is supplied from the sub tank, a resultant of the biasing force of the second biasing member acting on the second valve member of the second storage chamber and pressure of the ink becomes greater than the biasing force acting from the first biasing member of the downstream-side supply path on the first valve member, so that the second storage chamber and the downstream-side supply path communicate with each other.

2. The ink supply unit according to claim 1, wherein the first valve member includes a small-diameter portion of which an outer diameter is smaller than an inner diameter of the first ink flow hole, and that protrudes outward from the first ink flow hole, and a large-diameter portion of which an outer diameter is larger than the inner diameter of the first ink flow hole, and that is disposed inside the ink supply path, and when the element component is attached to the ink supply path, the small-diameter portion and the second valve member contact each other, and the first valve member and the second valve member respectively separate from the first ink flow hole and the second ink flow hole against the biasing forces of the first biasing member and the second biasing member.

3. The ink supply unit according to claim 1, further comprising:

a first sealing member disposed between the first valve member and the first ink flow hole; and a second sealing member disposed between the second valve member and the second ink flow hole, wherein when the element component is detached from the ink supply path, the first sealing member contacts the first valve member and a perimeter part of the first ink flow hole such that a gap between the first valve member and the first ink flow hole is sealed, and the second sealing member contacts the second valve member and a perimeter part of the second ink flow hole such that a gap between the second valve member and the second ink flow hole is sealed.

4. The ink supply unit according to claim 1, wherein the ink supply path includes a first plate that faces the element component, and that is formed of a laser light absorbing resin, a second plate that faces the first plate, and that is formed of a laser light transmissive resin, and a plurality of flow path forming ribs that protrude from the first plate toward the second plate, and by bonding the second plate and the flow path forming ribs together by applying laser light to the flow path forming ribs from a side of the second plate, the ink supply path is formed.

5. An inkjet recording apparatus, comprising:

an ink container that stores ink therein;

at least one recording head including a plurality of nozzles that eject the ink therefrom; and the ink supply unit according to claim 1 that is connected between the ink container and the recording head, and that supplies the ink from the ink container to the recording head.

* * * * *